United States Patent [19]
Ondrasik

[11] Patent Number: 5,238,256
[45] Date of Patent: * Aug. 24, 1993

[54] WHEELED GROCERY CART

[76] Inventor: John Ondrasik, 11215 S. Wilmington, Los Angeles, Calif. 90059

[ * ] Notice: The portion of the term of this patent subsequent to Apr. 21, 2009 has been disclaimed.

[21] Appl. No.: 826,134

[22] Filed: Jan. 27, 1992

Related U.S. Application Data

[60] Continuation of Ser. No. 607,911, Nov. 1, 1990, Pat. No. 5,106,111, which is a division of Ser. No. 372,238, Jun. 26, 1989, Pat. No. 5,020,811, which is a continuation of Ser. No. 112,729, Oct. 23, 1987, abandoned.

[51] Int. Cl.⁵ .................................. B62D 39/00
[52] U.S. Cl. ....................... 280/33.991; 280/33.993
[58] Field of Search ................. 280/33.991, 33.992, 280/33.993, 33.996, 33.997, 47.34, 47.35, 47.38; 220/485

[56] References Cited

U.S. PATENT DOCUMENTS

| | | | |
|---|---|---|---|
| 2,738,940 | 3/1956 | Coit, Jr. ................... | 220/485 |
| 2,890,057 | 6/1959 | Davis ..................... | 280/33.993 |
| 2,890,059 | 6/1959 | Brooks et al. ............. | 280/33.993 |
| 2,891,801 | 6/1959 | Sides ..................... | 280/33.993 |
| 2,911,227 | 11/1959 | Davis ..................... | 280/33.993 |
| 2,952,470 | 9/1960 | Lachance et al. .......... | 280/33.993 |
| 3,375,018 | 3/1968 | Close ..................... | 280/33.991 |
| 3,979,006 | 9/1976 | Furasek ................... | 220/485 |
| 4,600,204 | 7/1986 | Badger .................... | 280/33.992 |
| 5,106,111 | 4/1992 | Ondrasik .................. | 280/33.991 |

FOREIGN PATENT DOCUMENTS

| | | | |
|---|---|---|---|
| 1194860 | 2/1961 | France ..................... | 280/33.991 |
| 1372459 | 8/1964 | France ..................... | 280/33.991 |

Primary Examiner—Richard M. Camby
Attorney, Agent, or Firm—Brown, Martin, Haller & McClain

[57] ABSTRACT

A basket on a wheeled frame has as its front and side walls a generally U-shaped mesh and a planar mesh as the floor. A rear gate closes an open rear of the basket and pivots upward when another cart is nested therein. A basket top margin is reinforced by an inner and outer horizontal ring, both running along the upper terminuses of vertical struts of the U-shaped mesh, and by vertical struts of larger diameter uniformly distributed among the other vertical struts. A bottom outside horizontal ring makes smooth the bottom corners of the basket. Bumper strips are mountable on top the terminuses of said vertical struts. A raised collapsible pocket inside the basket has as its front wall a panel movable between an open position tilted away from said rear gate and a collapsed position flat against said rear gate. The panel is also a back rest for a seated child. A floor of the pocket collapses downwardly of its own weight through a hole defined by the panel as the panel is collapsed. Holes in the rear gate accommodate a child's legs. A hole closure is movable between a raised position against the rear gate and a lowered position resting on the pocket floor, and has an inclined forward edge by which it is forced by a collapsing panel into its raised position where it will remain until intentionally lowered by an operator. Bumpers mount on front vertical corners of the basket.

3 Claims, 4 Drawing Sheets

WHEELED GROCERY CART

This is a continuation of application Ser. No. 07/607,911 filed Nov. 1, 1990, now U.S. Pat. No. 5,106,111 which was a Divisional of application Ser. No. 07/372,238 filed Jun. 26, 1989, now U.S. Pat. No. 5,020,811 which was a continuation of application Ser. NO. 07/112,729 filed Oct. 23, 1987, abandoned.

BACKGROUND OF THE INVENTION

This invention relates to nesting grocery carts with an open-top container having a rearwardly collapsible, raised pocket therein for use as a rear-facing child's seat or a carrying bin.

Prior art grocery carts with a rearwardly collapsible, baby seat show a cart consisting of a wheeled frame with a wire mesh, open-top container (commonly called a "basket") mounted thereon. A panel which serves as a back rest for a child is pivoted at the rear of the container and is movable between two stable positions: a collapsed position flat against the container rear wall and an open position where it is tilted away from said rear wall. A base member (commonly called a "baby seat") which serves as a horizontal base for a child's seat is pivoted to the basket's rear wall and linked to the panel such that when the panel is in its collapsed position the base member is also collapsed either downwardly or upwardly against the rear wall, and when the panel is in its open position, the base member is generally horizontal between the panel and the rear wall. The rear wall of the basket defines a pair of leg holes or one large hole with a vertical crossbar to accommodate a seated child's legs which hang out the back of the basket through the holes. To close these holes when the baby seat is being used as a carrying bin to store groceries, purses and/or other items, a leg hole closure, usually a plate, is pivotally mounted and is movable to two stable positions: a raised position in which it closes said holes, and a lowered position where it provides a seat for the buttocks of a child.

Prior art grocery carts adapted to be nested together in telescopic fashion show a cart identical to the type previously described except that the rear wall of the basket is an upwardly swinging gate, and the baskets are generally tapered-down from back to front so that a substantial portion of the basket from one cart can be inserted into the basket of another cart from the rear, the rear gate of the receiving cart being pushed swingingly up and out of the way by the entering cart.

U.S. Pat. Nos. 2,891,801 by S. J. Sides and 2,896,959 by F. W. Young et al. both show a nesting grocery cart, as above, with a container having an upwardly swinging rear gate and a raised pocket with a base member. In each case a rear end of the base member is pivoted to the container's rear gate and a front end of the base member rides vertical struts of the panel upward by force applied to it by the panel when the panel is being pushed to its collapsed position. In such an arrangement the base member can stick for various reasons (e.g. deformation due to rough treatment, corrosion and wear) causing resistance to the collapse of the panel. Furthermore, any mechanical advantage gained by the panel acting as a lever against the base member decreases as the panel is moved closer to the rear wall of the container because the line of application of force moves up the vertical struts resulting in a decrease in effective lever arm length.

U.S. Pat. Nos. 2,890,059 by W. Brooks et al. and 2,911,227 by L. N. Davis both show a similar nesting grocery cart with a container having an upwardly swinging rear gate and a raised pocket with a base member. In each case a front end of the base member is pivoted to the panel and a rear end of the base member rides the container's rear gate upward when the panel is being collapsed. This arrangement also has the disadvantages inherent in designs where an end of the base member rides struts upward by force applied to it by a collapsing panel. This invention presents a base member which is not forced up, but rather it collapses downward of its own weight.

U.S. Pat. No. 2,890,057 by L. N. Davis and French Patent 84.169 by Ateliers Reunis S. A. both show a similar nesting grocery cart with a container having an upwardly swinging rear gate and a raised pocket with a base member. In each case the base member is pivoted to the container's rear gate, but as the panel collapses the base member collapses through an opening in the panel. These patents also each show a leg hole closure plate pivoted at the pivotal junction of the base member and the rear gate. In both cases the leg hole closure plate collapses downward through the panel with the base member when the panel is collapsing. When the panel is reopened the leg hole closure plate's initial position is the lowered position, i.e. resting on the base member. Such an arrangement is disadvantageous for most shoppers, because most shoppers do not have a small child with them and are in no need of a child's seat. However, it is well known that most shoppers tend to use the pocket to carry items, e.g. small parcels, fragile items and purses. With the initial position of the leg hole closure plate being in the lowered position, such shoppers must always move the plate to its raised position to prevent items from falling out of the leg holes in the rear gate. This invention presents a hole closure whose initial position, when the pocket is opened, is the raised position.

A problem common to all nesting cart baskets as described above is "swelling" which refers to an undesirable outward bowing of the basket walls, particularly the side walls. Swelling can be caused by cart collisions with walls, posts and the like. It can be caused by the countless impacts with the rear gates of other carts while being nested. It can also be caused, over time, by a property inherent in the vertical struts of most baskets as a result of the way said baskets are formed. Heretofore, baskets were formed by welding straight wire bars into a planar welded-wire mesh to form the floor of a basket. Extensions of the bars were then bent up to form vertical struts for the walls of the baskets, and horizontal strut "rings" were used to confine the upwardly bent portions to the desired shape. Vertical struts thusly formed have residual memory of their originally straight condition. This residual memory urges them outwardly against the rings and eventually can cause the sides to bow outwardly.

Excessive swelling can cause several problems. A swollen cart can be too wide to nest or fully nest, and even if such a cart can be nested, it can be very difficult to extract from the cart in which it is nesting.

Moreover, the rear gate of a cart in which a swollen cart is nested can collapse into the nested cart making it very difficult to free the carts from each other.

Another problem common to all nesting carts as described above is "droop" which refers to the undesirable downward sagging of the front of a basket in relation to the basket's rear. Drooping is primarily a deformation, over time, of the basket due to the countless loads carried by the basket. Drooping essentially misaligns the basket's front end and prevents or makes more difficult the nesting of a drooped cart.

In addition to nesting and unnesting problems caused by swelling and droop, they can also cause the painted finish of a cart to become marred. This is so because the carts must be more violently maneuvered during nesting and unnesting operations, which maneuvers can cause rubbing and jamming of the painted surfaces resulting in unsightly scars and nicks in the paint.

A further problem common to all cart baskets described above is the exposure of the tops of the vertical struts which can be irregular and oftentimes jagged. Clothing and other items can snag on them and be damaged. This problem is so pervasive that some manufactures have gone to plastic baskets to avoid it.

A further problem is caused by the fact that the edges along the bottom of the baskets of the prior art baskets are really pluralities of individual wire corners, the wires being bend at approximately a right angle and spaced apart. Edges of table tops, counters, and the like can catch the corners of the bent wires and deform them. Besides making the basket unsightly, such deformations can themselves cause nicks and other damage to a surface, such as a counter top or table, because said edges are not smooth.

This invention presents an improved grocery cart which eliminates the problems discussed above which are inherent in prior art carts. Other advantages and attributes will either be discussed or readily discernible from a reading of the text hereinafter.

SUMMARY OF THE INVENTION

This invention presents a grocery cart comprising a wheeled frame, a container mounted on said frame for carrying groceries and a pivoting rear gate which closes a rear opening of the container unless it is pivoted upward to accommodate the container of another cart nesting therein. Unlike the prior arts, the front and side walls of the container are made from a single piece of mesh which is generally and symmetrically U-shaped. A second and separate piece of planar mesh is the floor of the container, the floor piece being affixed (i.e. by welding) to a base margin of the U-shaped mesh piece. The mesh piece of the front and side walls comprises a plurality of generally vertical struts spaced apart and held in fixed relation by a plurality of generally U-shaped, generally horizontal struts (commonly referred to as "horizontal rings"). An inner such horizontal ring runs along the inside of the upper terminuses of the vertical struts, and an outer horizontal ring runs along the outside of said upper terminuses. Elongated bumper strips are mounted atop said terminuses. Preferably the strips have an elongated C-shaped cross-section for opposably hooking onto and grasping said inner and outer horizontal rings. Additionally, the cart can include a raised pocket in said container for carrying a child or other things, comprising: (a) a panel having a lower end pivoted to a lower end of a rear wall of the container and movable between an open position tilted away from said rear wall and a collapsed position flat against said rear wall for providing a front wall for the pocket and a back rest for a rearward facing child, (b) a base member extending generally horizontally between said rear wall and said panel in said open position to provide a base for a child's seat and a floor for the pocket, the base member being pivoted at its rear end to an intermediate position on said rear wall and being linked at its front end to said panel, said panel having an opening and said base member being collapsible downwardly through said opening as said panel moves towards its collapsed position, (c) at least one hole defined by said rear wall for extension there through of a seated child's legs, (d) a hole closure pivotally mounted at the rear end of said base member and movable between a raised position against said rear wall and a lowered position resting on said seat base member to provide a seat for the buttocks of the child, the hole closure generally closing said hole or holes when in the raised position, the leg hole closure having an upwardly angled front edge for contacting the panel as it is being collapsed and being urged upwardly into its raised position by the panel on the full collapse of the panel.

An object of this invention is to provide a wheeled grocery cart with a basket which is significantly more resistant to swelling than are prior art carts.

A further object of this invention is to provide a wheeled grocery cart with a basket which is significantly more resistant to droop than are prior art carts.

A further object of this invention is to provide a collapsible, raised pocket in the container of a wheeled grocery cart for use as a small child's seat and a carrying bin, which pocket includes a downwardly collapsible base member and a hole closure having a raised initial position.

Other objects will be readily apparent upon a reading of the text hereinafter.

DESCRIPTION OF THE PREFERRED EMBODIMENT

Figure 1:
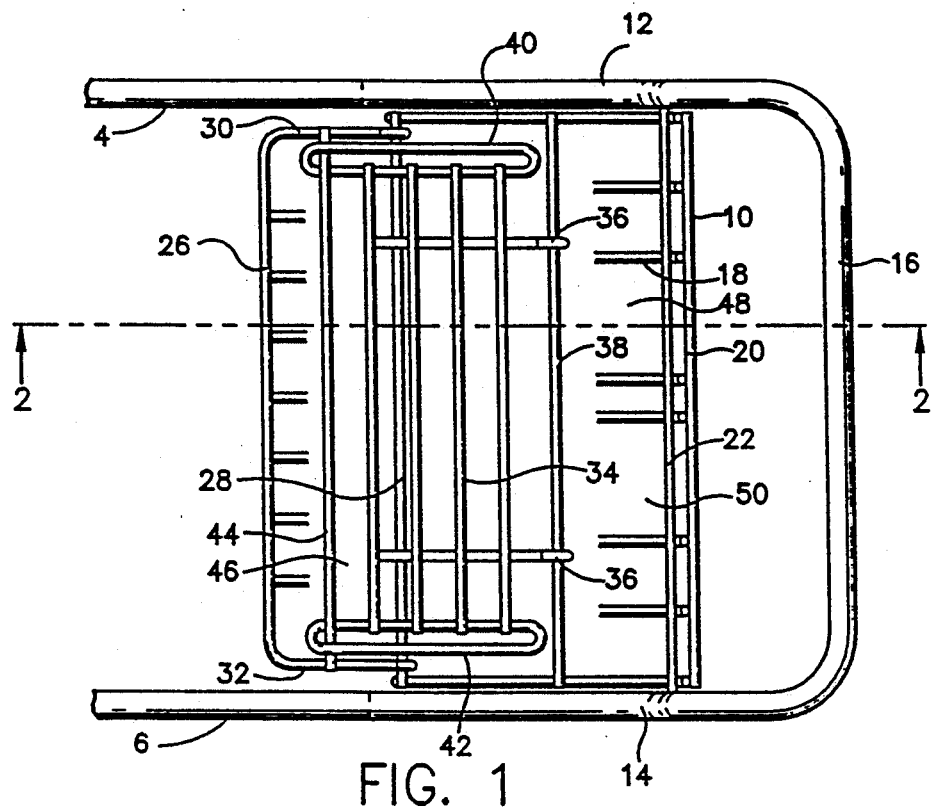
FIG. 1 is a plan view of the rear end of a grocery cart according to this invention illustrating an open pocket.
Figures 2, 3:
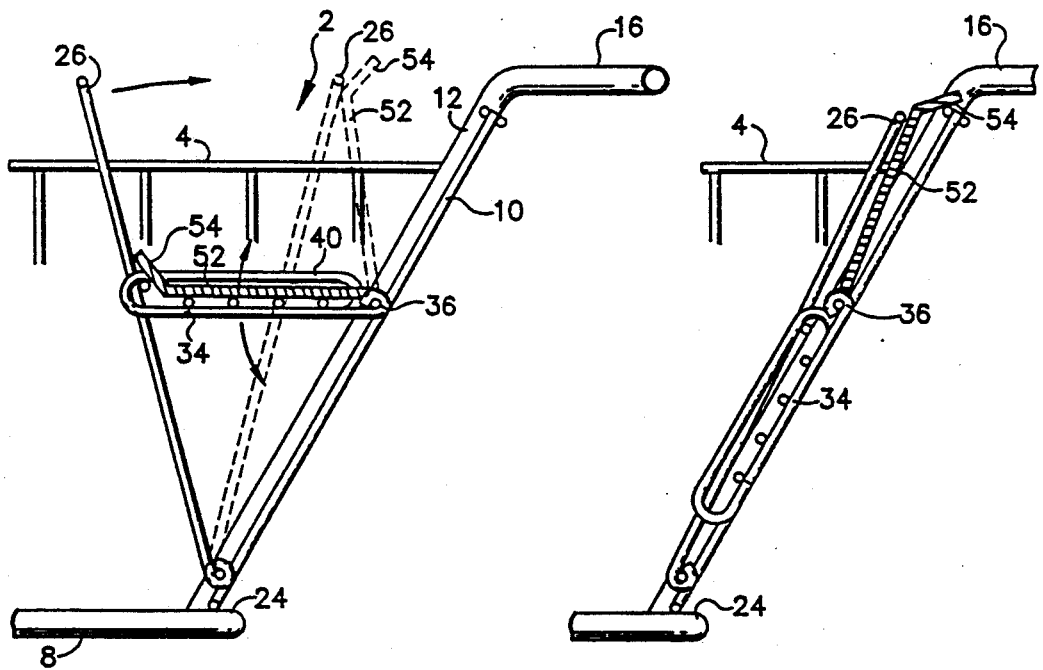
FIG. 2 is a partial sectional view taken along line 2—2 of FIG. 1 illustrating an open pocket of a grocery cart improved according to this invention.
FIG. 3 is a partial sectional view taken along line 3—3 of FIG. 1 illustrating a rearwardly closed or collapsed pocket of a grocery cart according to this invention.

Referring to FIGS. 1-3, the rear end of a grocery cart generally designated 2 is illustrated. The cart 2 has a container with side walls 4 and 6, a front wall (not shown), a floor By and a rear wall 10. For purposes of this invention and this specification, the rear wall 10 can be a fixed wall or an upwardly swinging gate as in the above-described telescopically nesting carts. The container 2 is mounted atop a wheeled frame partially shown by the angled, rear, corner struts 12 and 14 which are downward extensions of a crossbar handle 16.

The rear wall 10 as illustrated is swingable upwardly as a gate and comprises a generally rectangular wire mesh panel made from a plurality of generally vertical, inboard wire struts 18 held in spaced parallel relation by lateral, outboard struts 20 welded thereto. The upper end of the rear wall is pivoted to the frame by a upper lateral hinge bar 22 which is welded to the vertical struts 18 along their upper terminates on their inboard sides, the ends of said upper lateral hinge bar 22 being pintles in holes defined by the frame corner struts 12 and 14.

Preferably, at least one end of the hinge bar 22 has raised threads upon which is screwed an internally threaded sleeve. When the pintles are inserted in the holes defined by the frame corner struts, the sleeve is unscrewed to an extent necessary to prevent the pintles from being inadvertently dislodged from their respective holes, and the sleeve is then bonded by glue or other means in that extended position. The sleeve is effectively a means of extending the hinge bar after its ends have been inserted.

Since the frame corner struts are acutely angled inboardly from the vertical, a stop 24 prevents the rear wall from swinging downwardly beyond the frame corner struts, but the rear wall can swing upwardly enough to permit nesting of another such cart.

Referring again to FIGS. 1—3, a wire mesh panel 26 is pivoted at its lower end to a lower end of the rear wall 10 by means of a plurality of panel eyelets 28 loosely circumscribing a lower lateral hinge bar 28 which is welded to, or is an integral part of, the rear wall 10 at its lower margin. The eyelets are preferably looping extensions of panel vertical corner struts 30 and 32. The panel can lie flat against the rear wall or be tilted inboardly away from it. The extent to which the panel can be tilted away from the rear wall is limited by a base member 34 which provides a generally horizontal base between the panel and the rear wall. Thus the panel is movable between two stable positions: an open position tilted away from the rear wall and a collapsed position flat against said wall.

The base member 34 is a rectangular piece of wire mesh which is pivoted at its rear end to an intermediate position on the rear wall by means of a plurality of base member eyelets 36 loosely circumscribing an intermediate lateral hinge bar 38 which is welded to, or is an integral part of, the rear wall 10 at a position intermediate the upper lateral hinge bar 22 and the lower lateral hinge bar 28. The eyelets 36 are preferably looping extensions of base member wire struts.

The base member is linked to the panel 26 by a pair of elongated wire loops, 40 and 42, welded long-side atop the base member at its opposite lateral margins. Although the planes of the loops can be normal to the general plane of the base member, it is preferable for welding advantage that the loops be slightly outwardly angled. Confined by the loops is a lateral stop bar 44 which is welded to, or an integral part oft the panel, said stop bar extending through both loops and being generally parallel to, and on the same level as, the rear wall intermediate hinge bar 38. Below the panel stop bar the panel defines an opening 46 large enough for the base member to pass through, and the loops are wide enough to allow the base member to pass through the opening below the panel stop bar.

In operation, as the panel moves from its collapsed position to its open position, the panel stop bar acts against the base member loops forcing the base member to rotate upward until the stop bar reaches the front ends of the loops, as shown in FIG. 2. When the panel is moving in the opposite direction, gravity acts on the base member to rotate it downward passing beneath the panel stop bar and through the panel opening until it and the panel are flat against the rear wall of the container, as shown in FIG. 3.

When the panel 26 is in its open position a pocket is formed, the panel and the container rear wall 10 being the front and rear walls of the pocket, respectively, and the base member being the floor of the pocket. If the panel and base member extend fully between the side walls of the container, then said side walls also provide the side walls of the pocket. In order to use the pocket as a child's seat, leg holes, 48 and 50, are defined by the rear wall 10 so that a child seated in the pocket and facing the rear can extend his or her legs through the holes. To provide more comfort for a child and to block or close said leg holes when the pocket is used as a general purpose carrying bin, a leg hole closure 52, preferably a plate is pivoted to the rear wall 10 and is movable between two stable positions: a raised position against said rear wall where it blocks or closes said leg holes, and a lowered position resting on the base member 34 where it provides a smoother seat for the buttocks of a child. The leg hole closure 52 has an upwardly angled front edge 54 which, if the leg hole closure is in its lowered position, contacts the panel 26 as it is being collapsed, the angle being suitable to cause the leg hole closure to begin rotating upward by the force being applied to it by the collapsing panel. A 45 degree angle has been found to be suitable. As the panel continues its collapse, the leg hole closure is rotated until it is in its raised position. The leg hole closure will remain in its raised position until its position is changed by a user of the cart. In this way the initial position of the leg hole closure is always the raised position to suit the purposes of users who do not need a child's seat, which are the majority of the users.

Figure 4:
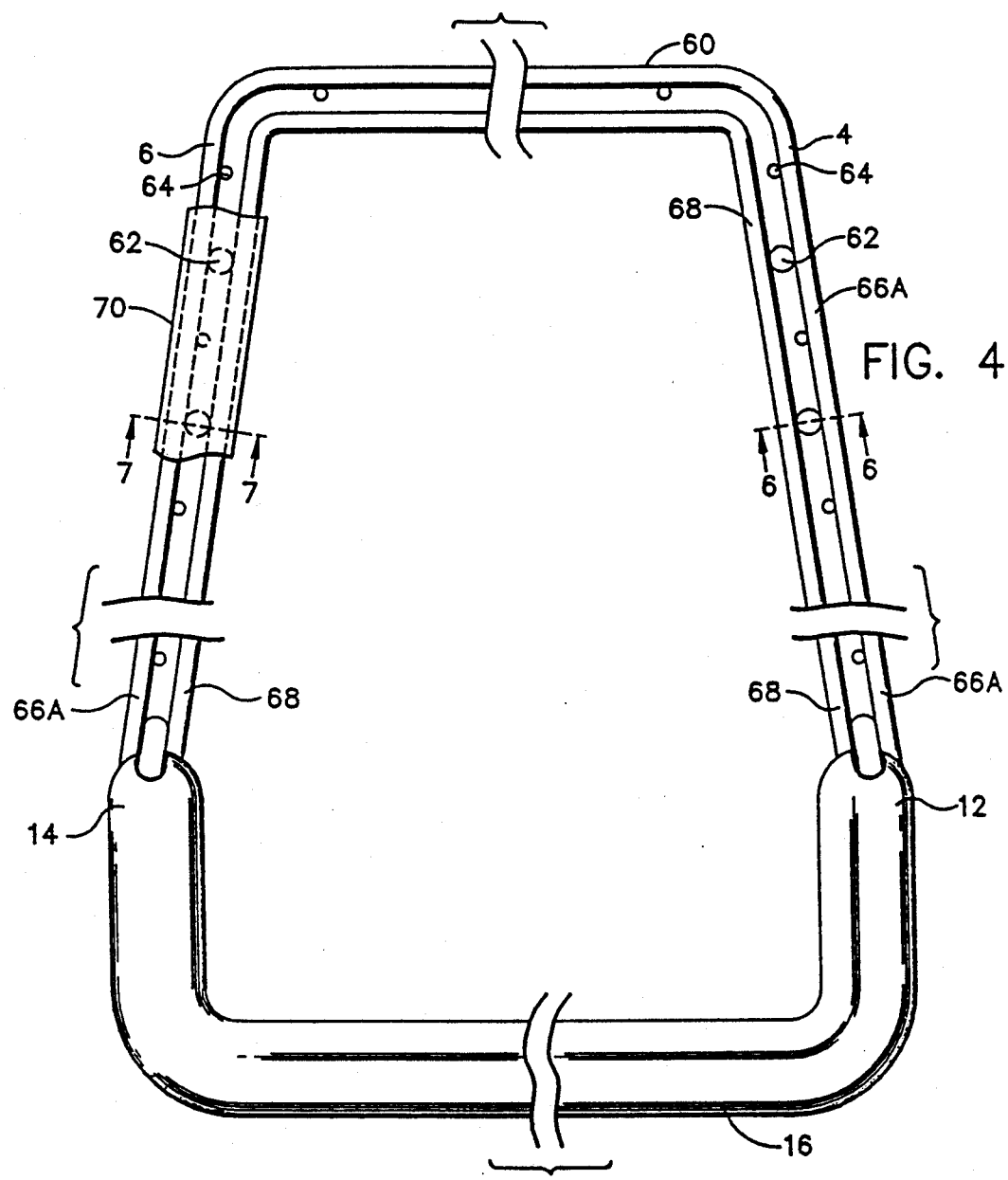
FIG. 4 is a broken plan view of a cart according to this invention.

Referring to FIG. 4, the top margin of the container is illustrated. The front wall 60 and the side walls, 4 and 6, of the container are actually sides of a single piece of U-shaped mesh. Said mesh comprises a plurality of generally vertical struts, 62 and 64, spaced apart and held in a generally horizontal U-shaped formation by a plurality of generally horizontal, generally U-shaped struts, commonly known as "horizontal rings". The horizontal rings are preferably welded to the outside of the vertical struts 62 and 64. The horizontal rings are spaced apart vertically with a top outer horizontal ring 66A running along and affixed to the outside of the terminuses of the vertical struts. A bottom horizontal ring 66B (see FIG. 8) runs along and is affixed to the outside of the lower terminuses of the vertical struts. A second, slightly smaller, horizontal ring 68 runs along the inside of the terminuses of the vertical struts. All of the horizontal rings end at the corner struts 12 and 14 of the wheeled frame.

Referring again to FIG. 4, it can be seen that the vertical struts 62 have a much larger cross sectional diameter than do the vertical struts 64. All of the vertical struts are affixed to the outside horizontal rings, but only the larger diameter vertical struts 62 are affixed, preferably by welding, to the inside horizontal ring 68. The larger diameter vertical struts 62 are interspersed among the other vertical struts 64 to give additional strength to the container. The inner top horizontal ring 68 has the effect of making the top margin of the container smooth on the inside, and also has the effect of hiding the terminuses of the vertical struts. The inner top horizontal ring also adds additional strength to the container to prevent it from swelling and drooping.

Figure 6:
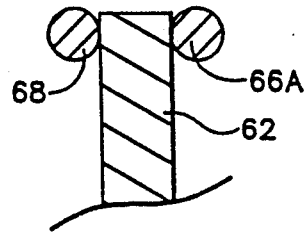
FIG. 6 is a partial cross-sectional view taken along line 6—6 of FIG. 4.
Figure 7:
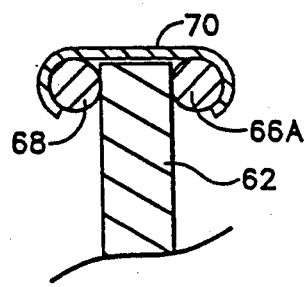
FIG. 7 is a partial cross-sectional view taken along line 7—7 of FIG. 4.
Figure 5:
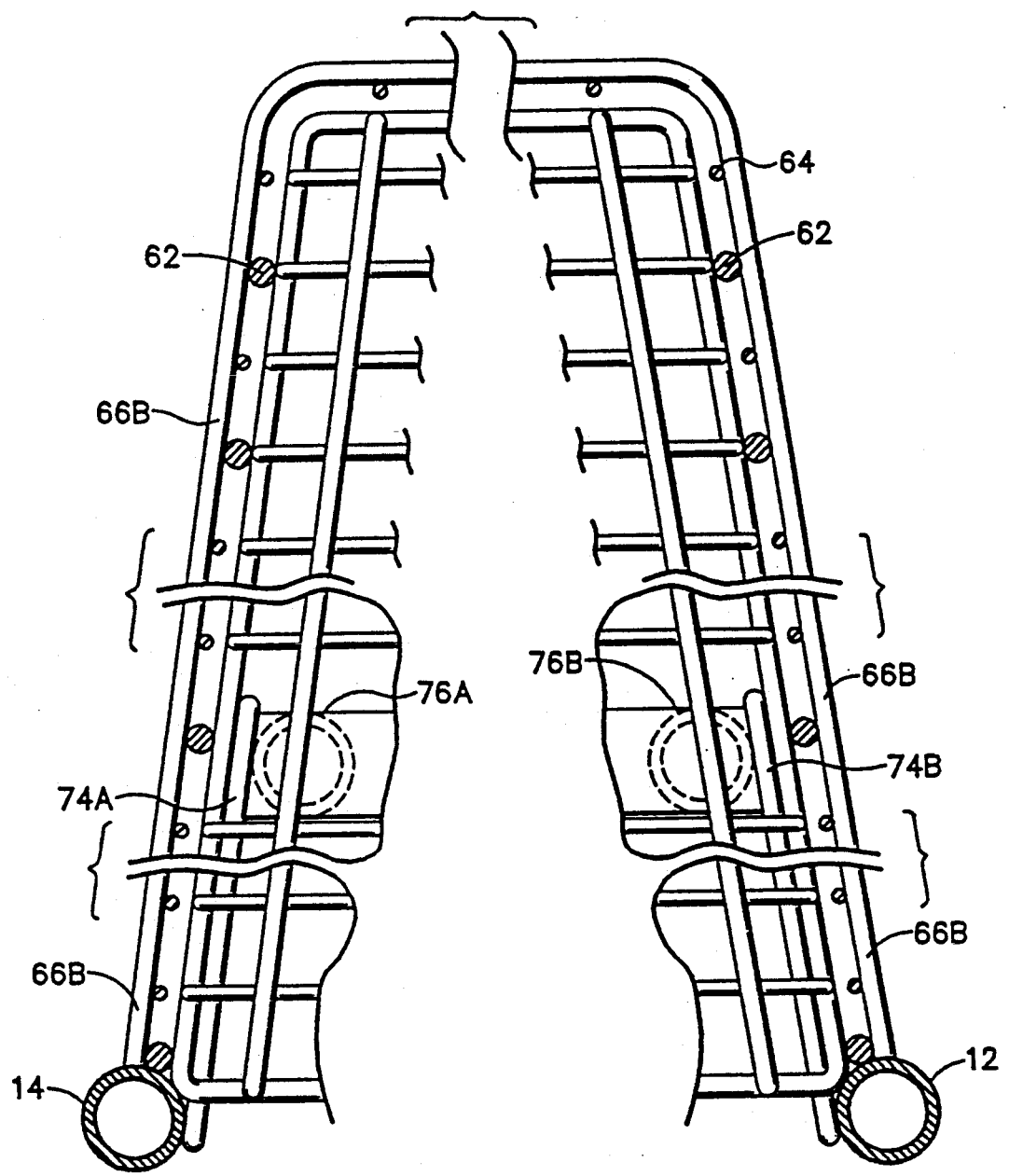
FIG. 5 is a broken section of a cart taken along a plane parallel to and slightly above a floor of the basket of a cart according to this invention.

Referring to FIG. 6, a cross-section of the top margin of the container is illustrated uncovered. In FIG. 7, however, the top margin of the container is illustrated to be covered by an elongated bumper strip 70 a portion of which is shown in FIG. 4. The bumper strips 70 have a an elongated C-shaped cross-section for opposably hooking onto and grasping the inner and outer horizontal rings, 68 and 66A respectively. The bumper strips 70 insure that the top margin of the container is smooth and non-jagged. Furthermore, they act to protect the paint finish on the carts which can become damaged during nesting and unnesting. During such operations, the top margin of the nesting container rubs against the end of the receiving cart. The buffer serves to prevent any damage due to the rubbing.

Figure 8:
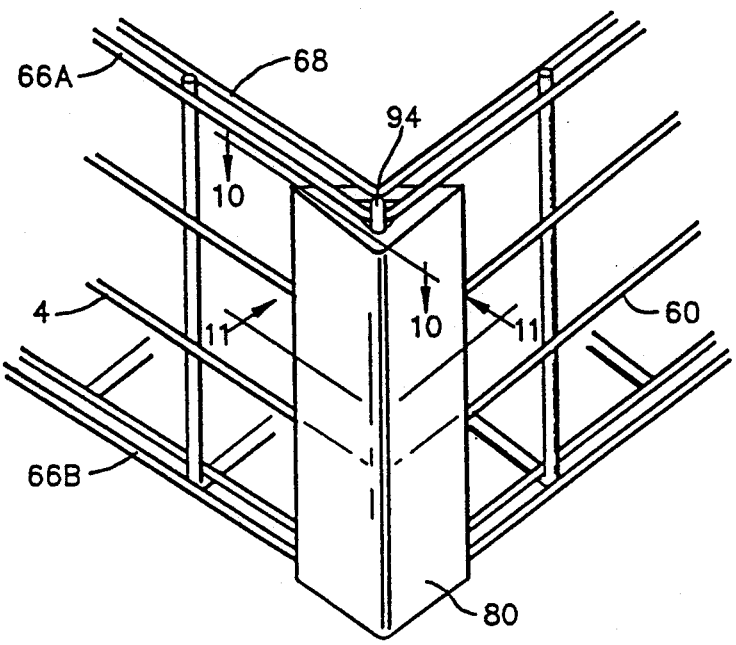
FIG. 8 is a perspective view of a front vertical corner of a basket with a bumper mounted thereon.
Figure 9:
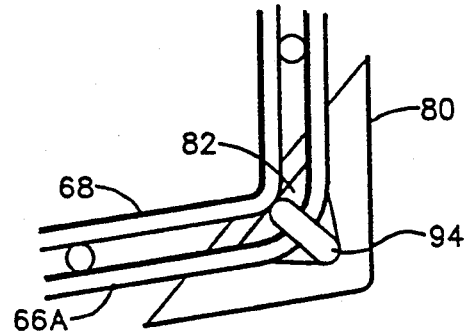
FIG. 9 is a plan view of the bumpered corner of FIG. 8.
Figure 10:
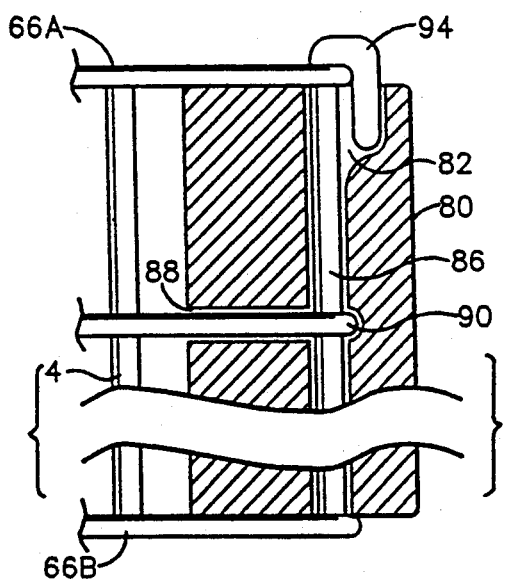
FIG. 10 is a cross-sectional view taken along line 10—10 of Figure B.
Figure 11:
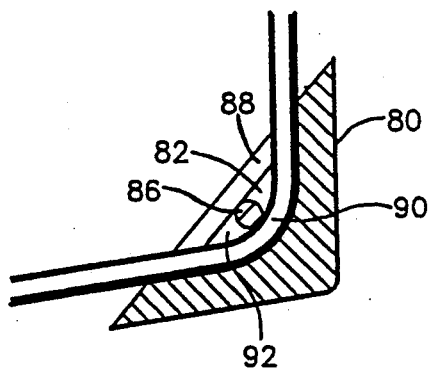
FIG. 11 is a cross-sectional view taken along line 11—11 of FIG. 8.

Referring to FIG. 8, the floor 72 of a cart is illustrated. The floor is a generally planar piece of mesh, the periphery 78 of which is adapted to conformed to the inside shape of the vertical strut 0 formation. The periphery of the floor mesh is affixed, preferably by welding, to the larger diameter vertical struts 62 at their terminuses. Beneath the floor and supporting the container are a pair of elongated brace bars 74A and 74B which are affixed at one end to the frame corner struts, 14 and 12 respectively, and at the other ends a pair of vertical frame members 76A and 76B.

Referring to FIGS. 8-11 a front vertical corner bumper is illustrated. The bumper is a bar 80 made from rubber or similarly resilient material and is mountable on either or both of the junctures between the basket's front wall 60 and the baskets side walls, 4 and 6, between the top and bottom horizontal rings, 66A and 66B. The bar 80 defines a longitudinal channel 82 opening at least at a top end 84 of the bar for receiving a latching rod 86. Since there are no vertical struts at said junctures, each such juncture comprises only bends in the horizontal rings. The bar 80 defines a plurality of slotted recesses 88 on a side which allow the horizontal ring bends 90 to penetrate the bar past the longitudinal channel. When a bar 80 is in placer the channel 82 generally aligns with the nooks 92 of the ring bends penetrating it so that when the latching rod is inserted into the channel, said rod is disposed in said nooks to latch the bar thereon. Preferably the latching bar has a hook 94 at a top end which hooks onto the top outer horizontal ring 66A, the end of the hook being forced into the channel 82. The bar extends far enough to be disposed in the nook of the bottom ring 66B. As shown in the figures, the bar 80 does not extend above the top horizontal ring 66A, but it should be recognized that it can be so extended with the hook 94 being disposed entirely in the channel.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:
1. A grocery cart, comprising:
    a wheeled frame;
    a container mounted on the frame for carrying groceries, the container comprising a first, generally U-shaped rigid mesh piece forming a front and symmetrical side walls of the container and a second, rigid planar mesh piece forming the floor of the container, the floor of the container being rigidly joined to the lower end of the front and side walls of the container;
    the container having an opening at its rear end;
    a rear gate pivoted to the frame for closing the rear open end of the container and pivoting upwardly to allow nesting of the container of a like cart within the cart container;
    the first mesh piece comprising a plurality of parallel, spaced-apart and generally vertical struts, and a plurality of spaced, parallel, generally horizontal rings extending across the vertical struts and holding said vertical struts in fixed relation to one another;
    said horizontal rings including a pair of spaced, separate and directly-opposing inner and outer upper rings aligned and generally co-planar with the free uppermost ends of the vertical struts, at least some of the vertical struts having a first diameter substantially equal to the spacing between the inner and outer upper rings and the inner and outer upper rings contacting and being secured directly to the inner and outer sides, respectively, of the uppermost ends of said vertical struts having said first diameter and enclosing and concealing the uppermost ends of the struts when viewed from a horizontal viewing direction; and
    a pair of spaced, separate and directly-opposing inner and outer lower rings aligned and generally co-planar with the lower ends of the vertical struts where the floor of the container is rigidly joined to the lower end of the front and side walls to reinforce and to make smooth the junctures between the container floor and the container's front and side walls.

2. The cart according to claim 1 further comprising at least one elongated, resilient bumper mountable on and protecting a corner between the container's front wall and a side wall.

3. The cart as claimed in claim 2, wherein there are no vertical struts at the corners of the container, and the bumper has an outer face shaped for extending over the corner, an inner face having a plurality of slotted recesses for fitting over the horizontal rings at said corner, a vertical channel, and a latching rod for extending through said channel on the inside of said corner to latch the bumper to the corner of the container.

* * * * *